Feb. 2, 1937.  F. J. STRASSNER  2,069,286
ORNAMENT
Filed Dec. 11, 1934

INVENTOR.
Frank J. Strassner
BY
ATTORNEY.

Patented Feb. 2, 1937

2,069,286

UNITED STATES PATENT OFFICE 2,069,286

ORNAMENT

Frank J. Strassner, Maplewood Township, Essex County, N. J.

Application December 11, 1934, Serial No. 756,944

6 Claims. (Cl. 41—34)

This invention relates to ornaments, and more particularly to ornaments adapted for affixation to an article surface. Especial reference is had to such ornaments as initials, monograms, silhouettes and the like, etched or otherwise formed—for example by stamping—from relatively thin, flat metal; it will be understood, however, that the principles of the invention may be applied in connection with other forms of ornaments. Illustrative of articles whose surfaces are to be ornamented may be mentioned cigarette cases and boxes, vanity cases, toiletware, trays, ash receivers, etc., etc.; at the same time the surface ornamentation of such mildly flexible articles as wallets, purses, hand-bags, etc. is also contemplated.

When the ornaments are attached to the article surfaces at the time of original manufacture of the articles, it may be found relatively convenient to affix them in any one of several manners. Several manners of affixation have been broadly shown in United States Letters Patent No. 1,953,784, issued Apr. 3, 1934, to Strassner and Whitmore. It is frequently necessary, however, to affix the ornaments to the articles at some later time and under some circumstances—for example in connection with the retail sale of the article—which preclude the proper performance of any but the simplest process of affixation.

It is an object of my invention to provide an ornament which may be affixed to an article surface at any time with a minimum of skill, labor, and material or equipment.

It is another object to provide an ornament which may be affixed with great facility to an article surface, and with negligible risk of its later detachment.

A common means of affixing the ornament to the article surface is a binding medium interposed between the ornament and the article surface and adapted to adhere to each. One of the deficiencies of such binding media as at present known is the tendency toward disruption of the medium or of its adhesion to either ornament or article surface, when the ornament and article have materially different temperature coefficients of expansion and contraction and are subjected after ornament affixation to appreciable temperature change. The seriousness of this deficiency may be minimized when the affixation process can be carried out under more or less ideal circumstances in respect of skill, materials and facilities. The deficiency has tended to become more significant, however—particularly in respect of the adhesion between the medium and the article surface—the simpler the affixation process has been made.

An object of my invention is the provision of an improved binding medium for use between ornament and article surface.

Another object of my invention is the provision of a binding medium which permits a most simple process of ornament affixation and which, after such process has been carried out, will have suitable internal characteristics, and sufficient adhesion to both ornament and article, to resist the disruptions abovementioned.

A further object is to provide an ornament to which there already adheres a binding medium having the desirable characteristics last abovementioned.

Other and allied objects will more fully appear from the following description and the appended claims.

In the description reference is had to the accompanying drawing, of which:

Figure 1:
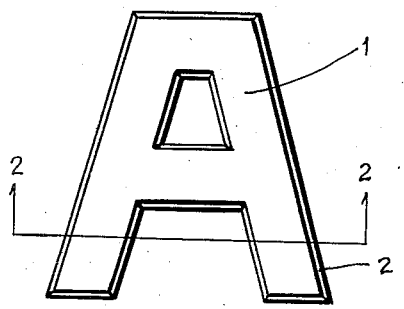
Figure 1 is a front face view of an etched ornament, illustratively in the form of the letter "A", which may be provided with my improved binding medium.

I contemplate as an ornament adapted for very simple affixation one on whose rear face is exposed a coating of water soluble adhesive—for example of the variety used in the higher grades of "gummed" labels and tapes, which remain indefinitely in a condition wherein they can be quickly made sticky by the application of water or saliva. Such an ornament could be affixed to an article surface by the extremely simple process of moistening the adhesive coating and pressing the ornament against the surface. I have found, however, that a binding medium interposed between ornament and surface and composed wholly of such material has, when dry, too small an elastic limit to accommodate itself to the longitudinal strains set up in the medium by unequal expansion or contraction of ornament and article; disruption of the medium or of its adhesion to ornament or article surface is quite likely under even moderate temperature changes.

A material of higher elastic limit is to be found in non-water soluble cements, such as cellulose and synthetic resin cements—particularly the latter. Ornaments have been made with such cement already adhering to their rear faces, the cement being adapted to be softened by a suitable solvent just prior to pressing of the ornament against the article surface. I do not visualize the softening of the cement by an appropriate solvent as being so simple a process as the moistening by water or saliva of the water soluble adhesive above discussed, particularly in view of the requirement for a supply of the special solvent at the place of ornament affixation. More importantly, however, I have found that the adhesion of a binding medium so formed and applied to the article surface is very frequently faulty with the result that the ornaments very often become detached from the surfaces. Among the possible reasons for this may be mentioned a reluctance of the cement to become well softened by application of the appropriate solvent if the dried cement has been long exposed to the atmosphere and to light before solvent application; the likely failure of the affixer of the ornament—often a person unskilled in the use of cements—to allow sufficient time for the solvent to soften the cement before affixation; the characteristics of the surfaces to be ornamented, these frequently being poorly suited to adhesion with the cement unless first subjected to a surface sizing treatment which it is usually impracticable to give them; etc. All of these factors are of especial significance when the article with ornament affixed is subjected to temperature changes; for while the cement may have a sufficient elastic limit itself to withstand the longitudinal strains set up by the differential expansion or contraction, there is an attendant strain on its adhesions to ornament an article surface. Having been applied to the ornament while fluid, and under otherwise relatively ideal circumstances, its adhesion to the ornament almost invariably withstands these strains; the strains are likely to be fatal, however, to its less excellent adhesion to the article surface.

According to my invention the rear face of the ornament is coated with a non-water soluble cement, preferably having a relatively high elastic limit when dry; when this cement has dried, it in turn is coated with a water soluble adhesive, for example of the variety above mentioned. Upon the drying of this adhesive the ornament may be stored indefinitely under random conditions, being always ready for affixation upon moistening of the water soluble adhesive with water or saliva.

Figure 2:
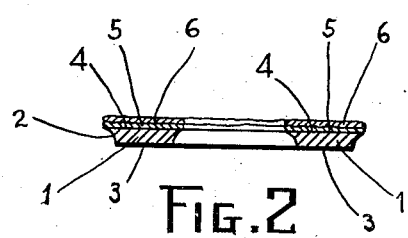
Figure 2 is a cross-sectional view taken along the line 2—2 of Figure 1, the ornament appearing with its back face upwards.
Figure 3:
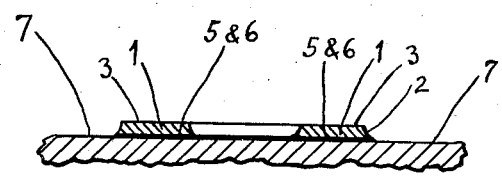
Figure 3 is a view generally similar to Figure 2, but illustrating in cross-section the ornament affixed to an article surface with its front face upwards.

In the drawing I have illustrated my invention in connection with an ornament 1, etched from thin metal in manner to provide arcuate, bevelled edges 2 as described in the patent abovementioned; it is obvious, however, that this invention is not limited to use with this particular form of ornament. The front face of the ornament is designated as 3, and the rear or back face as 4. On the back face 4 in Figure 2 appears the coating 5 of non-water soluble cement, and over this the coating 6 of water soluble adhesive—each applied preferably in a thoroughly fluid state, the latter after drying of the former. Either or both the coatings may of course be laminated— i. e., applied in two or more individual coatings each dried before application of the succeeding one. In Figure 2 the thicknesses of the coatings 5 and 6 have been exaggerated in the interest of illustration; the preferred thickness of the ornament has also been exaggerated, the actual ornaments being preferably thin, and also somewhat flexible if intended for application to other than quite rigid surfaces. Figure 3 illustrates the ornament 1 after affixation to an article surface 7, a single heavy line being employed in this figure to denote the coatings 5 and 6.

Thus my improved binding medium comprises the combination of the non-water soluble cement coating 5 and the water soluble adhesive coating 6; the ornament adapted for simple affixation is one to which this binding medium has been applied with the coatings in the order named. Obviously the process of affixing this ornament is of the utmost simplicity, comprising simply the moistening with water or saliva of the coating 6 and the pressing of the ornament against the article surface. Furthermore I have found that the ornaments so affixed reliably remain attached to the article surfaces. As far as strains within the binding medium are concerned, the coating 5 with its relatively high elastic limit absorbs these strains without disruption. The adhesion of the coating 5 to the rear ornament face 4, and the adhesion of the coating 6 to the dried coating 5, are each excellent, the respective coatings in each case having been applied in fluid condition; the latter of these adhesions is made further proof against longitudinal strains by the inherent slight surface irregularities in the dried coating 5, to which the coating 6, applied fluid, fully conforms itself. Finally the adhesion of coating 6 to the article surface, being relieved by the elasticity of the coating 5 of the extremely high temperature-produced strains occurring in the absence of that coating, will withstand wide temperature changes and has proven thoroughly satisfactory with practically all article surfaces and under almost all conditions of after-use of the articles short of continued soaking in water.

It may of course be mentioned that should the removal from the surface of the ornament be at any time deliberately desired, this may be accomplished by a sufficient and apt application of either water or a solvent appropriate to the coating 5.

It will of course be understood that my invention is capable of modification without departure from its true scope; that scope is intended to be expressed in the appended claims, as broadly as the state of the art will permit.

Where I have referred in this specification to a fluid state of cement or adhesive, I mean to denote, unless otherwise specially qualified, only a sufficiently fluid state to insure full conformity of the material to the material or surface to which it is applied.

I claim:—

1. A metal ornament having a rear surface and carrying a binding medium whereby to secure the same to a surface to be ornamented, said medium comprising a coating of non-water soluble cement adhering to said ornament surface, and a coating of water soluble adhesive adhering to said first coating, said second coating being adapted to be moistened for adhesion to said second surface.

2. A metal ornament having a rear surface and carrying a binding medium whereby to secure the same to a surface to be ornamented, said medium comprising a coating of non-water soluble cement having a relatively high elastic limit and adhering to said ornament surface, and a coating of water soluble adhesive adhering to said first coating, said second coating being adapted to be moistened for adhesion to said second surface.

3. A relatively thin and flat metal ornament adapted for affixation to an article surface, having on its rear face a coating of non-water soluble cement, and thereover a coating of water soluble adhesive.

4. A relatively thin and flat metal ornament adapted for affixation to an article surface, having on its rear face a coating of non-water soluble cement of relatively high elastic limit, and thereover a coating of water soluble adhesive.

5. A metal ornament having a rear surface and carrying a binding medium whereby to secure the same to a surface to be ornamented, said medium comprising an exposed coating of adhesive of relatively small elastic limit adapted to be moistened for adhesion to said second surface, and a layer of cement of relatively high elastic limit interposed between and adhering to both said coating and said ornament surface.

6. A relatively thin and flat metal ornament adapted for affixation to an article surface, having an exposed rear coating of adhesive of relatively small elastic limit, and a layer of cement of relatively high elastic limit interposed between and adhering to both said coating and said ornament.

FRANK J. STRASSNER.